(No Model.)
S. M. VAUCLAIN.
HOISTING TACKLE.
No. 381,043. Patented Apr. 10, 1888.
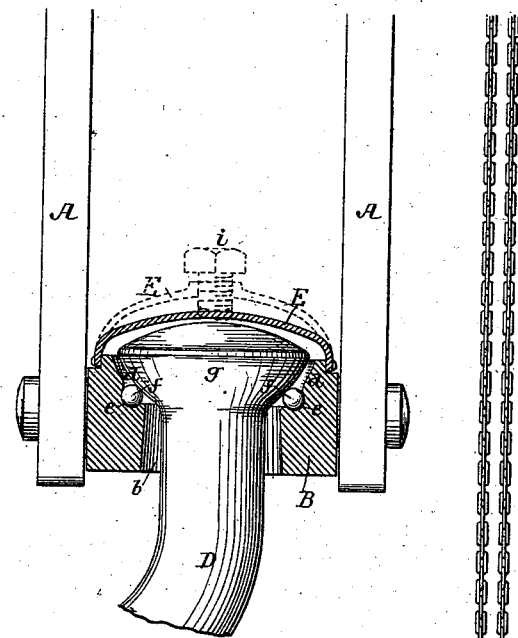
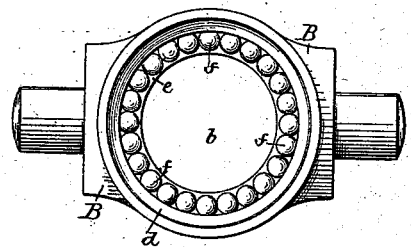
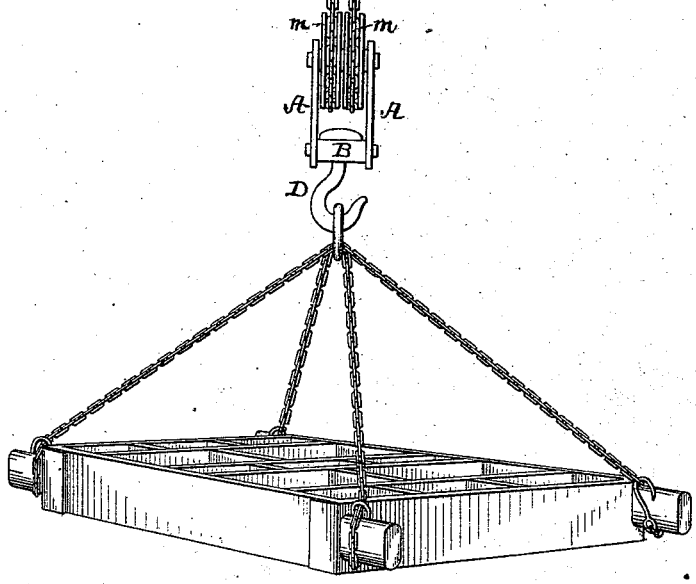
Witnesses.
Alex. Barkoff
David S. Williams
Inventor:
Samuel M. Vauclain
by his Attorneys
Howson & Howson

UNITED STATES PATENT OFFICE.

SAMUEL M. VAUCLAIN, OF PHILADELPHIA, PENNSYLVANIA.

HOISTING-TACKLE.

SPECIFICATION forming part of Letters Patent No. 381,043, dated April 10, 1888.

Application filed December 12, 1887. Serial No. 257,653. (No model.)

*To all whom it may concern:*

Be it known that I, SAMUEL M. VAUCLAIN, a citizen of the United States, and a resident of Philadelphia, Pennsylvania, have invented certain Improvements in Hoisting-Tackle, of which the following is a specification.

The object of my invention is to so form the connection between the hook and bearing-plate of a hoisting-block as to always insure freedom and ease both in the universal swing and in the swiveling movement of the hook, my especial improvement being the provision of a ball or roller bearing between the head of the hook and its socket.

In the accompanying drawings, Figure 1 is a side view of my improved hoisting-block with the load suspended therefrom. Fig. 2 is a sectional view, on a larger scale and partly in elevation, of sufficient of the hook and block to illustrate my invention; and Fig. 3 is a plan view of the bearing for the head of the hook, with the cover-plate removed.

Hoisting-tackle has heretofore been made with universal swing and swiveling connections between the suspension-hook and the block carrying the same, the hook having a rounded head adapted to a rounded socket in the bearing-plate of the block. I have found by experience, however, that in a very short time the wear of the parts causes such a snug fit between the head of the block and its socket that it is impossible to turn the hook independently of the block either with a heavy or light load, the turning of the hook having the effect of twisting the hoisting-chains around each other, thus rendering it impossible to raise or lower the hook until the chain is untwisted. This is especially annoying where it is desired to lift and adjust large and heavy articles—such, for instance, as the flasks used in casting the larger parts of locomotives, stationary and marine engines—or where heavy parts of machinery have to be set in place on the frame and accurate adjustment is required.

I overcome the difficulty by constructing the bearing of the hook in the following manner:

Referring to Figs. 2 and 3, A A are the side frames of the block, supporting a cross-bar, B, which has a central orifice, b, for the reception of the shank of the hook, the upper portion, d, of this orifice being enlarged in cup shape, so as to present in section a segment of a circle. I form in this cup-shaped portion d an annular groove, e, in which I place a number of small spheres, f, which are free to revolve in any direction.

The hook D has a head, g, the under side of which is in the form of a segment of a sphere and of about the same radius as the sides of the cup d, the top of the head g being preferably rounded in order to increase the strength of the head.

I have found that by the above-described construction I can not only dispense with the use of oil on the bearing, but can at all times, whether with a heavy or light load, rotate or swing the hook with the greatest ease, so that where it formerly took six men to turn and adjust in position a large casting-flask one man can now do the work quite as effectively.

I cover the head of the hook with a cap, E, which is secured in any suitable manner to the cross-bar B, and prevents dust and dirt from gaining access to the joint between the head of the hook and the cross-bar, the cap also serving to prevent the hook from jumping from its bearings.

In some cases I provide the cap with a set-screw, i, at the top, as shown by dotted lines in Fig. 2, so as to regulate the amount of vertical play of the hook.

The upper ends of the side frames, A, of the block carry a shaft for the chain-pulleys m m, as usual.

I claim as my invention—

1. The combination, in a hoisting-block, of a bearing having a cup-shaped socket with a groove therein, a series of spheres having a bearing in said groove, and a hook having a rounded head which rests upon the spheres and is free to turn and to rock thereon, all substantially as described.

2. The combination of the supporting-bar and the swinging head swiveled thereon with the cap E, secured to the bar B, and occupying such a position in respect to the head of the hook as to prevent said head from jumping from its bearings, all substantially as described.

In testimony whereof I have signed my name to this specification in the presence of two subscribing witnesses.

S. M. VAUCLAIN.

Witnesses:
DAVIS H. HANSELL,
CHAS. E. WALL.